(No Model.)

W. L. SILVEY.
SECONDARY BATTERY.

No. 484,120. Patented Oct. 11, 1892.

Witnesses.

Inventor
William L. Silvey

UNITED STATES PATENT OFFICE.

WILLIAM L. SILVEY, OF LIMA, OHIO.

SECONDARY BATTERY.

SPECIFICATION forming part of Letters Patent No. 484,120, dated October 11, 1892.

Application filed January 29, 1892. Serial No. 419,628. (No model.)

*To all whom it may concern:*

Be it known that I, WILLIAM L. SILVEY, a citizen of the United States, residing at Lima, in the county of Allen and State of Ohio, have invented certain new and useful Improvements in Secondary Batteries; and I do hereby declare the following to be a full, clear, and exact description of the invention, such as will enable others skilled in the art to which it appertains to make and use the same.

This invention relates to a process of initially preparing the plates or electrodes of so-called "secondary" or "storage" batteries, whereby the material employed as an active agent is caused to adhere tenaciously to the support upon which it is placed and whereby the subsequent expansion of the active agent is prevented and the buckling of the plate during subsequent use is entirely avoided and the dropping off of the active material prevented.

The objects of the invention, broadly stated, are, first, to establish an intimate union of the active material with the support previous to being formed as opposed to such mechanical means as are commonly employed for retaining the said material in position, and to prepare the active material against expansion or disintegration when undergoing its subsequent formation under chemical and electrical influence as opposed to the ordinary methods of subjecting the plates to chemical and electrical influence without any preliminary preparation.

The invention consists in the process of preparing secondary-battery electrodes or plates, as will hereinafter be fully described in the specification, and pointed out in the claims.

Figure 1:
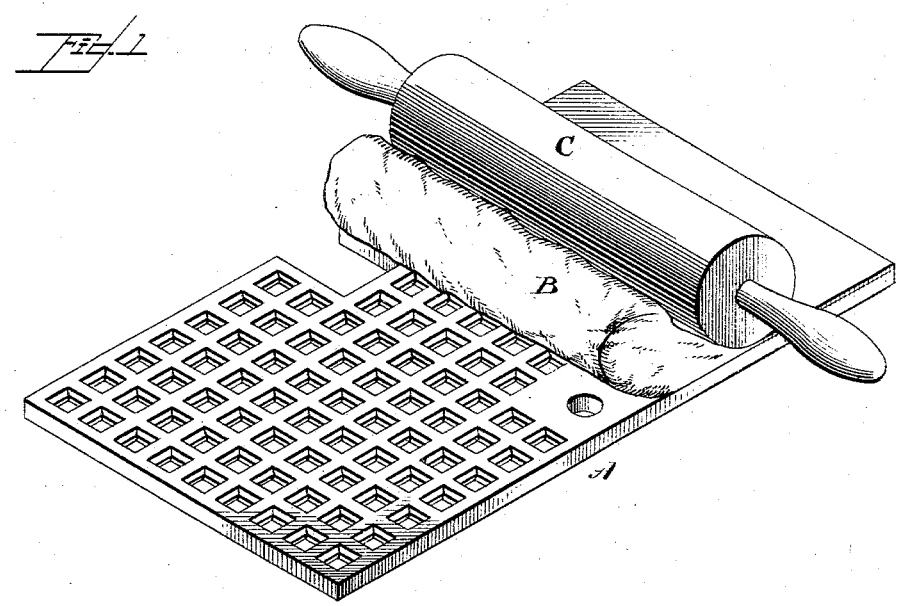
Figure 2:
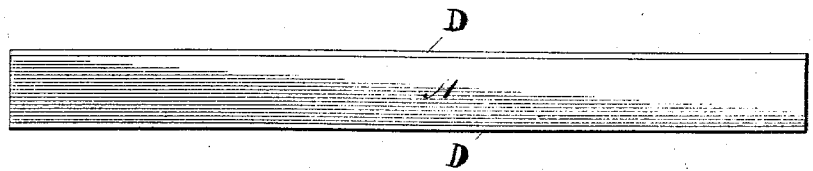
Figure 3:
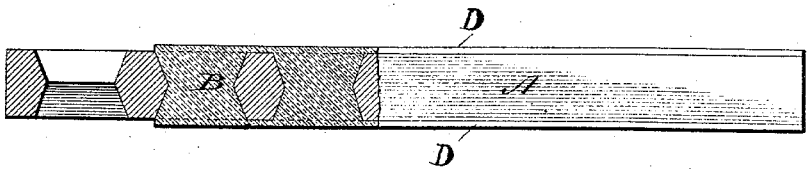

In the accompanying drawings, similar letters referring to similar parts, Figure 1 represents a perspective view of a plate being filled by my improved process; Fig. 2, an edge view of a plate having the active material applied to it, leaving a layer on the surface; and Fig. 3, an edge view of a plate in which are holes extending through the body of the plate and filled with the active material after my process, part of the plate being shown in section with the filling in the holes and part of the plate with the holes empty.

In the drawings, A represents a suitable electrode, and B represents the active material supported thereby.

C represents my preferred device for spreading or applying the active material to the plate; D a chemical envelope whereby the plate or support and the active material are firmly bound together.

In preparing the active material with which the plates or electrodes are united, covered, or filled I proceed as follows: It is to be understood I use a metallic oxide for filling both the positive and negative electrodes of my battery; but as a secondary battery in its action tends to produce oxygen on its positive plate and hydrogen on its negative plate it therefore leads me to employ a metallic oxide having the very lowest affinity for a sulphuric-acid solution when left to itself or after having been once charged. For these reasons I employ an oxide of lead for both the positive and negative plates, and since the oxide on the negative plate is reduced to a metallic state and the positive plate is changed to a higher oxide I have found that the lower oxides of lead, as litharge of commerce, are best suited for the active surface of the negative plate and peroxide of lead or its best substitute, red lead of commerce, being the best material for the active surface of the positive plate readily attainable.

In carrying my invention into effect I first take two suitable vessels, into one of which I pour a quantity of water, preferably *aqua distillata*, or rain-water, into which is stirred and thoroughly admixed a suitable low oxide of lead (preferably litharge) until a paste free from lumps and dry oxide is produced. Into the other vessel I now pour a quantity of water mixed with sulphuric acid to 15° to 25° Baumé, (about 22° being preferable,) and into this liquid I stir and thoroughly mix a higher oxide of lead (red lead) until a paste free from lumps is produced, care being taken that the paste does not become too dry, in which case it may become lumpy and hard. The two kinds of pastes thus prepared are intended for the negative and positive plates, respectively, and should not be allowed to become mixed or the work may be spoiled. A roller E is now procured (shown in Fig. 1) and heated to a temperature about the same as that of a mangle-roller. The positive plates are now placed on a table, and a quantity of the red-lead paste is placed on them and the heated roller rolled over the paste. The steam which arises from the hot roll, coming in contact with the solution in the wet paste, forces the active material into every pore of the grid or electrode and at the same time the acid quickly oxidizes its surface, thereby producing a firm union of the active material with the plate. The heated roller will not adhere to the paste unless it is allowed to become too cold. The positive plates thus prepared are now, while still damp, immersed in a pickling solution of sulphuric acid and water 15° to 25° Baumé (about 22° being preferred) and allowed to remain therein until the oxides have been thoroughly acted upon by the solution, at which time the lead salt has become thoroughly hardened and adheres to the plate with considerable tenacity. The negative plates are now taken and a quantity of the damp litharge is rolled into place with the hot roller, the hot steam forcing the oxide of lead firmly in place into the plate. The plate is now taken and immersed in a pickling solution of sulphuric acid and water of 25° to 35° Baumé, (about 30° being preferred,) in which they are allowed to remain two or three days, or until the paste has become thoroughly hardened by the absorption of the sulphuric acid from the solution. It will be observed that the specific gravity of the pickling solution in which the negative plates are immersed is higher than for the positive plates. This is used because I have found that the negative plates will not absorb the sulphuric acid from the solution as rapidly as the positive plates; but at the same time they have a greater capacity for sulphur and therefore require a higher gravity solution to thoroughly pickle and harden them; but when once pickled the paste will be much harder than the paste in the positive plate.

During the pickling of the positive and negative plates just described the support A and the active material B, owing to the action of the acid thereon, become coated or covered with a precipitate of a practically-insoluble sulphate of lead, which forms an inclosing film, coating, or envelope D and serves to bind the oxide firmly to the support, thus establishing an intimate union of the lead support A with the active material. By employing solutions of sulphuric acid and water—such as I describe for the positive and negative plates—little or no heat is generated, so that the supports or plates are not strained or buckled by any sudden or violent expansion of the oxides, which would inevitably result if a pure acid bath or a very strong acid solution were employed or where the plates were filled with or covered with a metallic oxide in a dry state. The plates, having remained in the pickling-bath the required time—one to three days—are removed and are either perfectly dried or only sufficiently to enable being handled without danger of the acid eating the hands or destroying the clothing. A number sufficient to form a complete battery are then immersed in a suitable acid bath connected with a suitable source of electricity and are formed in the usual manner.

By the initial pickling process just described the oxide is caused to undergo practically all the expansion possible, and as the expansion is gradual, owing to the weakness of the solution in which the pickling is done and the length of time it is left therein, any tendency to subsequent disintegration is prevented. Besides, during the pickling process the oxide will absorb enough sulphuric acid that the solution in which the plates are afterward charged will not be robbed of its acid, and therefore will serve only as a conductor, and therefore may be relied upon to have the proper gravity. Thus when the final step is taken—namely, when the electrode is formed—the violent chemical and electrical action to which they are subjected does not cause any further expansion of the oxides, so that its position on the support remains unchanged. Furthermore, the initial process of filling and pickling renders the oxides to a remarkable degree susceptible to electrical influence when being formed, so that much less time is required for this latter step than when the ordinary methods are pursued. In practice I have mounted the plate before pasting, and also after pasting, and before pickling. I have also formed the plates in the same solution in which they were pickled and sometimes without removing them therefrom; but I prefer, as a matter of economy, first to fill, then to pickle, and finally to form them.

By spreading the oxides into position by a hot roller or spreader and then treating them in an acid solution, as described, they possess three very great advantages: First, they are firm and porous both before and after being formed; secondly, they are firmly attached to the plate or support by the envelope or film of sulphate of lead, and, thirdly, they offer every advantage for rapid action while being formed.

Having fully described my invention, what I claim as new, and desire to secure by Letters Patent of the United States, is—

1. The process of initially preparing secondary-battery plates, which consists in mixing a suitable metallic oxide with a liquid, placing the resulting paste on a suitable support, subjecting the oxide to the action of heat and pressure, and then pickling the whole in an acid solution.

2. The process of making secondary-battery plates, which consists in mixing a suitable metallic oxide with a liquid, placing the resulting paste on a suitable support, subjecting the oxide to the action of heat and pressure, pickling the whole in an acid solution, and then forming.

3. The process of making secondary-battery plates, which consists in mixing an oxide of lead with a liquid, placing the resulting paste on a suitable support, subjecting the oxide to the action of heat and pressure, pickling the whole in a solution of sulphuric acid and water, and then forming.

4. The process of making secondary-battery plates, which consists in mixing an oxide of lead with a liquid, placing the resulting paste on a suitable support, subjecting the oxide to the action of heat and pressure, pickling the whole in a solution of sulphuric acid of from 15° to 35° Baumé, and then forming.

5. The process of making secondary-battery plates, which consists in mixing an oxide of lead with a liquid, placing the resulting paste on a suitable support, subjecting the oxide to the action of heat and pressure, pickling the whole in an acid solution, and then forming in the pickling solution.

6. The process of intimately uniting the active material with the supporting-plate of a secondary battery, which consists in mixing a suitable metallic oxide with a liquid, placing the resulting paste on a suitable metallic support, subjecting the oxide to the action of heat and pressure, and then pickling the whole in an acid solution until an envelope of a combination of the oxide and the metal of the support with the acid is produced.

7. The process of chemically uniting the active material with the supporting-plate of a secondary battery, which consists in mixing an oxide of lead with a liquid, placing the resulting paste on a suitable metallic support, subjecting the oxide to the action of heat and pressure, and then pickling the whole in an acid solution until an envelope of a sulphate is produced.

8. The process of making secondary-battery plates, which consists in mixing a metallic oxide with a liquid, placing the resultant product on a suitable support, subjecting it to the action of heat, then pickling it in a solution, and forming.

In testimony whereof I affix my signature in presence of two witnesses.

WILLIAM L. SILVEY.

Witnesses:
ED. L. SPENCER,
C. U. RAYMOND.